Figure 1:
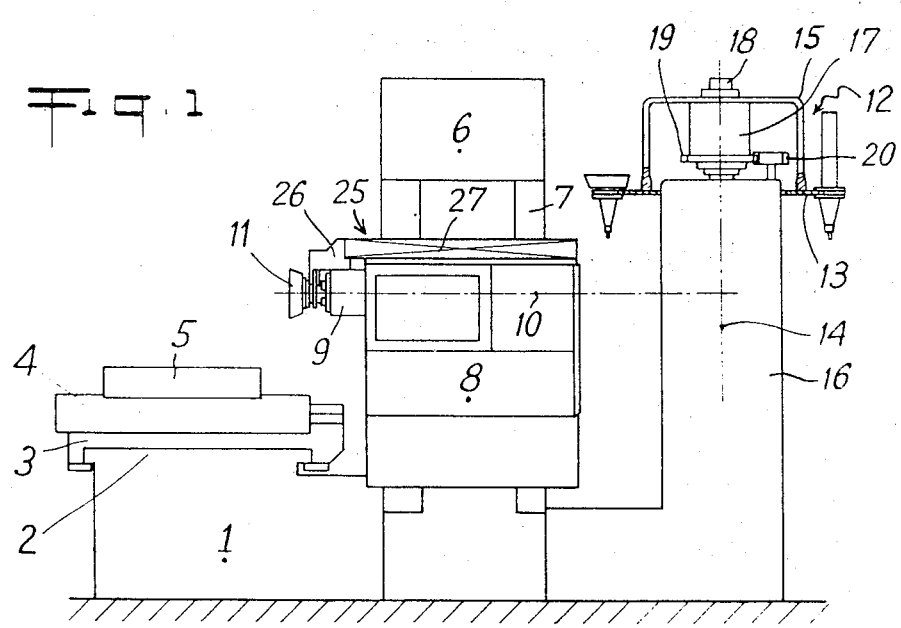

United States Patent [19]
Pegard

[11] 3,789,472
[45] Feb. 5, 1974

[54] DEVICE FOR AUTOMATICALLY CHANGING TOOLS

[75] Inventor: Pierre Pegard, Courbevoie, France

[73] Assignee: Ateliers G.S.P. (Guillemin, Sergot, Pegard), Courbevoie, France

[22] Filed: Aug. 24, 1971

[21] Appl. No.: 174,314

[30] Foreign Application Priority Data
Sept. 3, 1970  France .............................. 7032105

[52] U.S. Cl. ............ 29/568, 279/1 ME, 29/DIG. 94, 29/DIG. 104, 90/11 A
[51] Int. Cl. .......................................... B23q 3/157
[58] Field of Search ......... 29/568, 26 A DIG. 104, 29/DIG. 94, DIG. 86; 90/11 A, 11 R; 279/1 ME, 1 TS

[56] References Cited
UNITED STATES PATENTS

| | | | |
|---|---|---|---|
| 3,520,050 | 7/1970 | Trebble .............................. | 29/568 |
| 3,344,511 | 10/1967 | Hosca .................................. | 29/568 |
| 3,650,018 | 3/1972 | Perry et al. .......................... | 29/568 |
| 2,376,594 | 5/1945 | Hite .................................... | 279/1 ME |
| 2,380,648 | 7/1945 | Hite .................................... | 279/1 ME |
| 2,619,357 | 11/1952 | Montgomery ....................... | 279/1 ME |
| 2,711,904 | 6/1955 | Gardner et al. .................... | 279/1 ME |
| 3,524,248 | 8/1970 | Durr et al. .......................... | 29/568 |

*Primary Examiner*—Andrew R. Juhasz
*Assistant Examiner*—Z. R. Bilinsky

[57] ABSTRACT

A device for automatically changing tools which can be used with a machine which has at least one substantially horizontal tool holder, the device including a transfer mechanism for transferring the tools from a tool holder to a magazine, and having a clamp with jaws which are capable of gripping and holding a flange projecting from the tool, and which, while the machine is in operation, are open and located on opposite sides of the flange of the tool mounted in the tool holder, the tool having a projecting main plate, which is of the same shape as the flange and which is so arranged in front of the flange that it defines with the latter an opening into which a jaw of the clamp can enter, the main plate being located when a tool is mounted in the tool holder in the same plane as a pair of plates on the holder to form a protector against the penetration of shavings between the flange and the jaws of the clamp.

7 Claims, 10 Drawing Figures

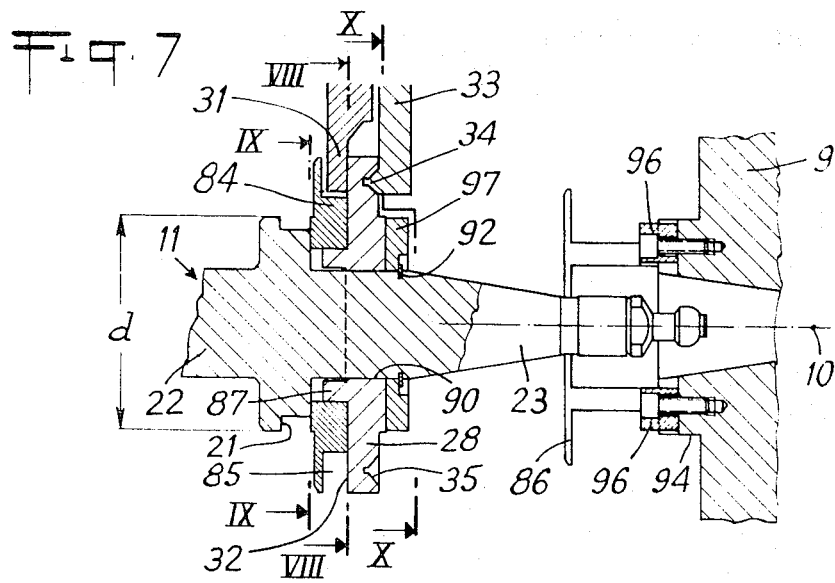
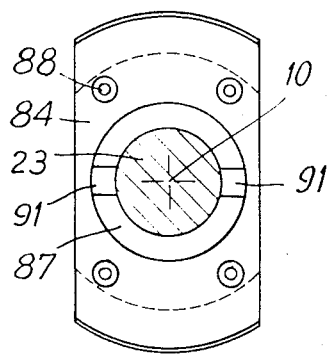
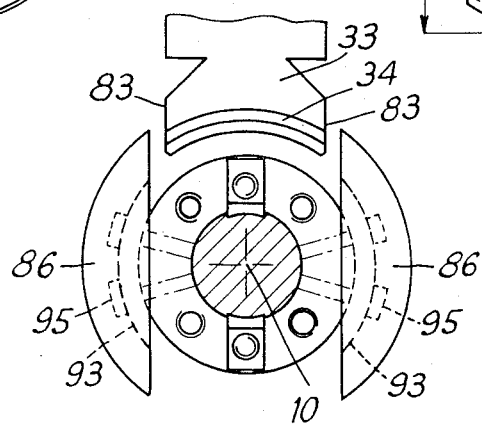
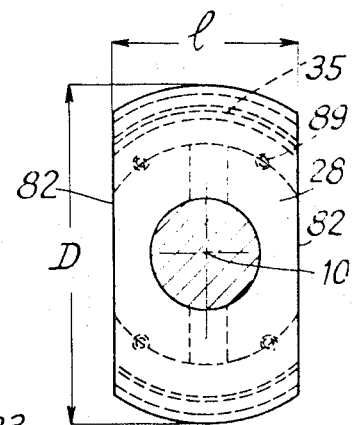

DEVICE FOR AUTOMATICALLY CHANGING TOOLS

The present invention relates to devices for automatically changing tools for use with machines having at least one substantially horizontal tool holder, such as a driven spindle and to the adaptation of such devices to machines for performing the noted function.

Some known devices utilize a rotary magazine having a horizontal axis and are positioned distant from the machine, necessitating thereby complex transfer manipulation of the tools between the magazine and the drive spindle of the machine. Accordingly, transfer machanisms presently used are of complex construction and require extensive maintenance; moreover, the "dead" time required for changing tools is relatively high, and consequently, the cost of the machining operation is quite high.

Other known devices have their magazines located close to the machine drive spindle and are mounted on the machine head for movement therewith. Tool transfer is thus simplified and time for transfer is also shortened. However the tools stored in the magazine are lengthy, hindering thereby the approach of the work piece to be machined to the drive spindle of the machine. Also, the number of tools which can be placed in reserve in such magazine is limited.

The aim of the invention is to avoid the shortcomings of the described prior devices while incorporating some of the advantageous features thereof;

a. by supporting the magazine other than on the machine head so that machine operation will not be interfered with,
b. by assuring integrity of operation,
c. by increasing the number of tools which can be held in reserve,
d. by assuring free access between the workpiece to be machined and the tool for machining thereof,
e. by arranging the axis of rotation of the magazine vertically so that tools received in slots of the magazine are readily supported and accurately indexed during rotation of the magazine, and
f. by simplifying the construction and arrangement of the transfer mechanism as well as its programmed control device.

The transfer mechanism construction is simplified because it is operated under control of simple longitudinal movements. Hence, the speed of operation may be very high and "dead" time small. Moreover, the control sequence is simple and therefore susceptible to programming. Finally, the mechanism is characterized by very high reliability making for trouble-free operation.

Simplification of the structure of the transfer mechanism also results from the disposition of the tool gripping clamp and from the design of a tilt effecting mechanism enabling the tool to be tilted from a horizontal to a vertical position and vice versa. In the inoperative position of the clamp, which is close to the operating tool, the clamp is open but within ready reach of the tool, thereby ensuring faster tool change and reduced "dead" time. As regards the tilt effecting mechanism, by utilizing a cam for transforming a part of the longitudinal movement into a pivotal movement enables the mechanism to be operated with a single longitudinal feed device without reducing the transfer speed and with one sequence of the program omitted.

The invention also aims to reduce magazine bulkiness for a given storage handling capacity. This is achieved by reducing the flange size of the tools which cooperate with the gripping clamp. As a result the width of the slots defining storage spaces in the magazine can be reduced.

Finally the invention aims to prevent entry of chips between the flange of the operating tool and the clamp in the inoperative position of the clamp since such chips would find their way to and damage the tool gripping clamp. This is true because the clamp in its open position straddles the flange of the tool which is rotating and hence any chips entering between the rotating flange and the relatively fixed jaws may scar the flange and the clamp surfaces.

In the device according to the invention, each tool has, between its machining end and its tool gripping end and/or on the drive spindle of the device, the aforementioned flange which is of small width. The transfer mechanism for transferring the tools from the machine drive spindle, forming the toolholder, to the magazine comprises as aforementioned a clamp, the jaws of which are no larger than flanges of the tool to be gripped, this clamp when open being positioned in such a manner that its jaws are spaced from and located on opposite sides of the flange of the tool, while held by the drive spindle toolholder. Each tool is provided with a main plate similarly shaped as the flange and arranged in front of and defining with the latter a restricted space into which the front fixed jaw of the clamp enters. The drive spindle tool holder is provided with two auxiliary plates which, when the relevant tool is mounted to the tool holder, are disposed in the same plane as the main plate and to either side thereof to form therewith a circular protector preventing penetration of chips between the flange of the tool and the jaws of the clamp.

According to one particularly advantageous embodiment, the tool transfer mechanism comprises, where the slots in the magazine are provided for holding the tools along a substantially vertical axis, at least one sliding member which, on the one hand, is guided for movement parallel to the drive shaft along a support for the head of the tool holder drive shaft, and which, on the other hand, is connected to a longitudinally operating feed member, the clamp being mounted to pivot on the sliding member about an axis at right angles to the longitudinal axis of movement of the sliding member and connected to a positive tilting device bearing on the support.

Preferably, the positive tilting device comprises at least one guided member and at least one guiding member, the former being supported by the sliding member and the latter by the support, the guiding member having a cam profile close to the tool holder, in order to produce pivoting action of the clamp during longitudinal movement of the sliding member, and a rectilinear part close to the magazine and parallel to the longitudinal axis to assure retention of the tool gripped by the clamp in vertical position.

Advantageously, the aforementioned support is a second sliding member guided for movement parallel to the first along a carriage fixed to the head of the tool holder drive shaft, this second sliding member being actuable by a hydraulically operated feed member.

Various additional features and advantages of the invention will be apparent from the detailed description which follows.

Figure 2:
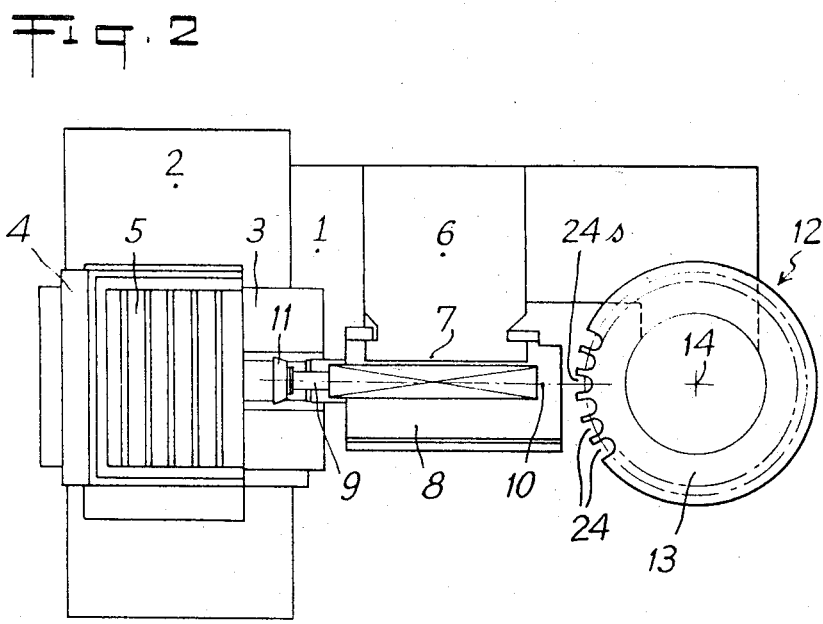
Figure 3:
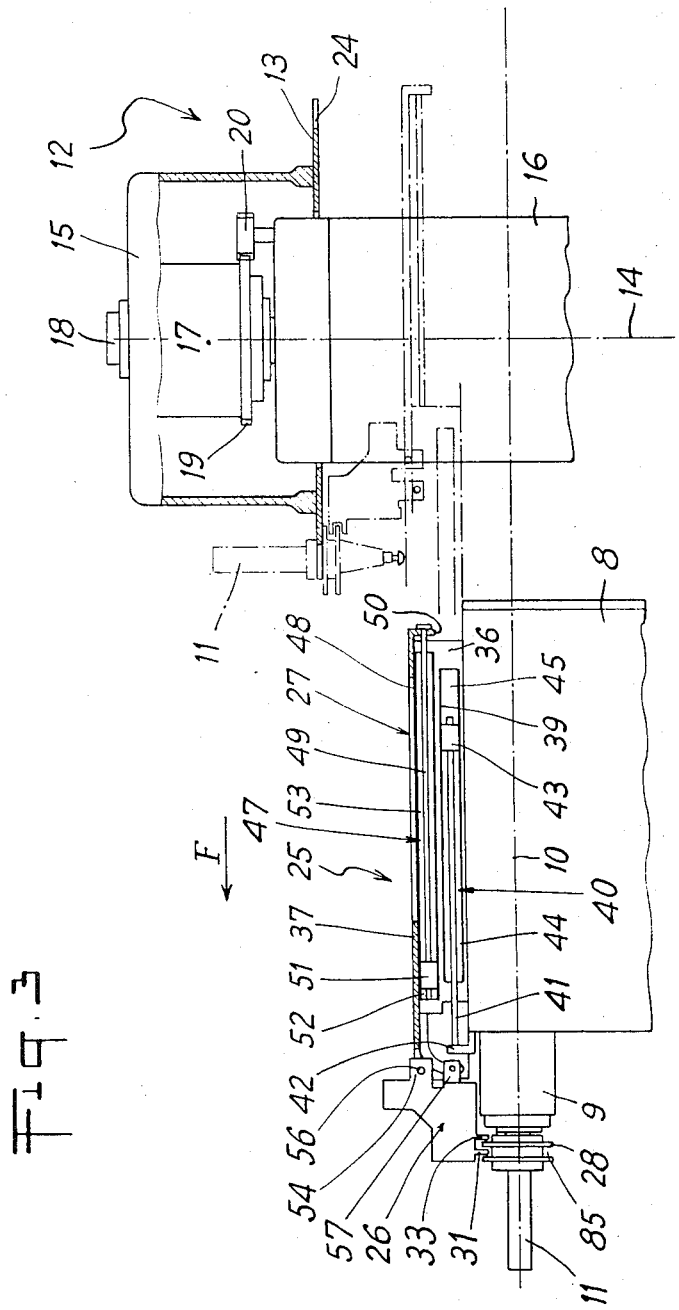
Figure 4:
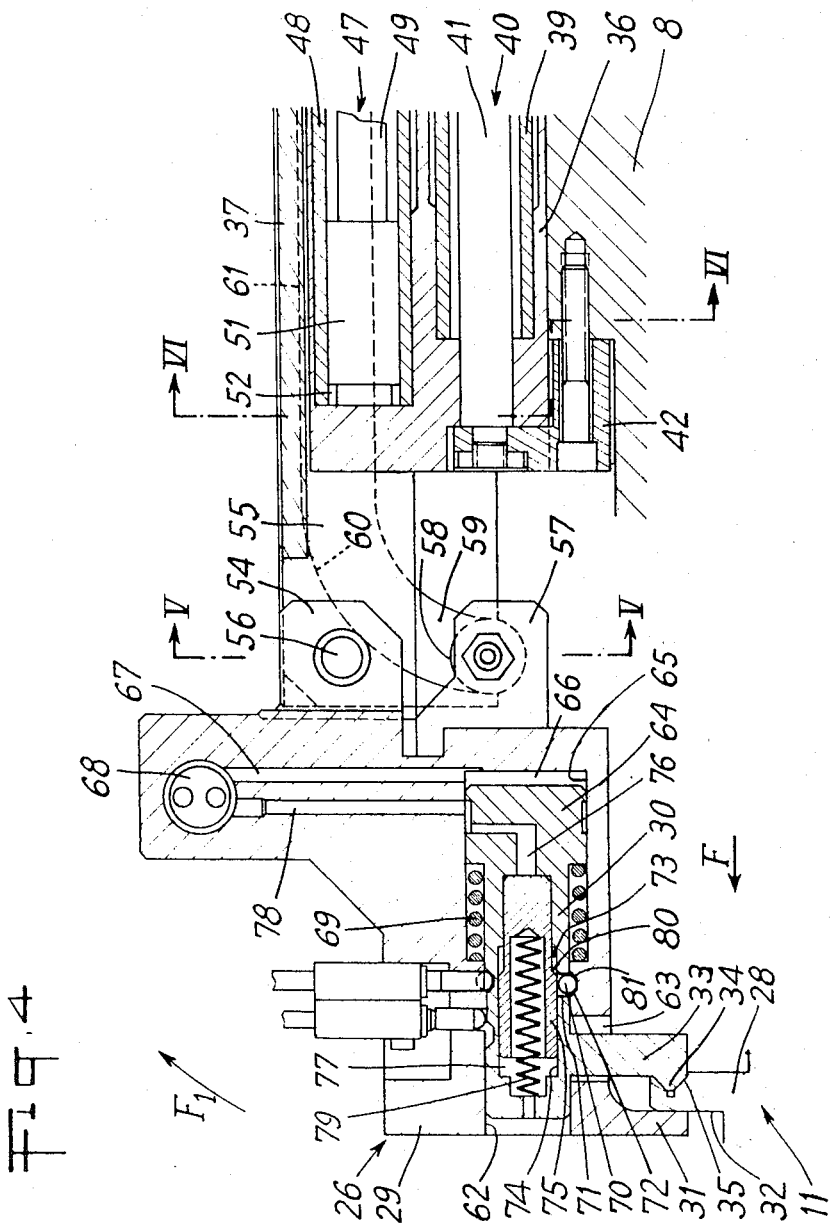
Figure 5:
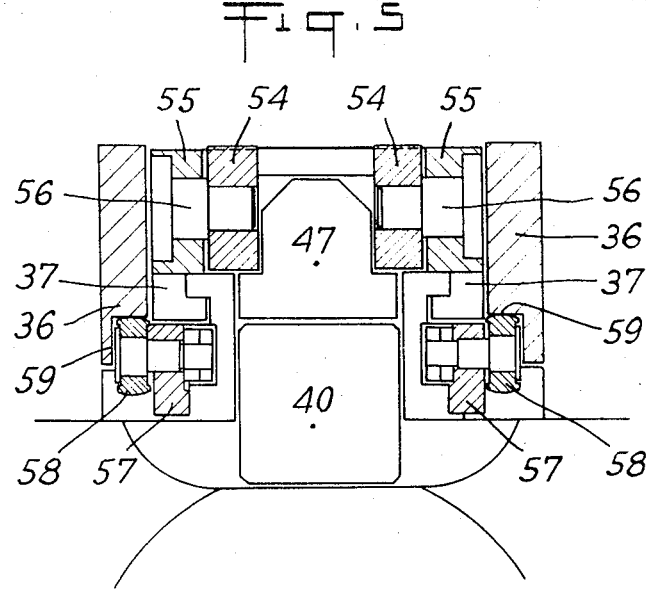
Figure 6:
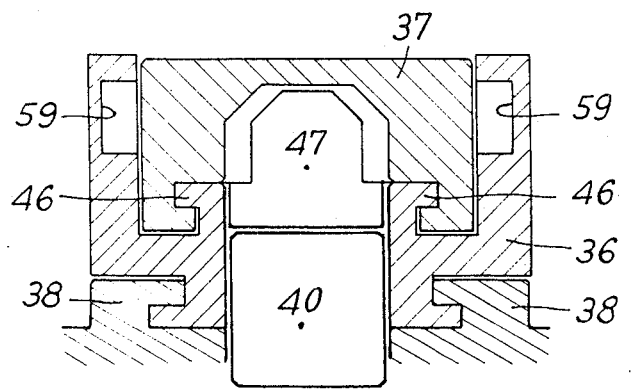

One embodiment of the invention will now be described, by way of a non-limiting example, with reference to the accompanying drawing in which:

FIG. 1 is a diagrammatic side elevation of a machine fitted with a device for automatically changing tools, FIG. 2 is a top plan view of the arrangement of FIG. 1, FIG. 3 is an elevation partly in section and to a much larger scale of the transfer mechanism shown in FIG. 1, FIG. 4 is a part vertical section through the longitudinal axis of the transfer mechanism shown in FIG. 3 and to a scale larger than FIG. 3 and showing the clamp of the transfer mechanism and its connection to the movable carriages, FIGS. 5 and 6 are cross-sections taken along the lines V—V and VI—VI respectively of FIG. 4, FIG. 7 is a view similar to FIG. 4 and shows the guard for the tool flange and clamp, and FIGS. 8–10 are cross-sections taken along the lines VIII—VIII to X—X of FIG. 7.

The machine shown by way of example in FIGS. 1-3 is intended for use primarily in milling, reaming, boring or tapping operations.

It comprises a fixed frame 1 having a bed 2 supporting a table 5 orthogonally adjustably movable in a horizontal plane. The work piece to be machined is fixed to table 5.

The frame 1 is also integral with an upright 6 located at the rear of the bed 2, having a vertical slide 7 for directly guiding a head 8 adapted to receive a tool holder drive spindle.

A tool holder 9 in the form of a drive spindle is mounted for rotation about and for longitudinal sliding movement in the head along a horizontal axis 10. The tool holder 9 is at a vertical position (FIG. 1) on the slide 7 enabling a tool 11 positioned in the holder to be stored in a magazine upon transferring the tool positioned in the holder to the magazine by means described in greater detail hereinafter. After the tool in the holder is transferred to the magazine another tool is removed from the magazine and positioned in the tool holder for performing a further operation on a work piece.

The magazine 12 is shown in FIGS. 1-3 comprises a circular groved or notched wheel 13 having a vertical axis 14 about which it is adapted to be rotatably driven. To this end, the wheel 13 is carried by a drum 15 which caps the upper end of column 16, integrally formed with the frame 1, the column, as seen in FIG. 1, being behind upright 6. An inner hub 17 of the drum 15 is provided, on the one hand, with coils wound on a rod 18 fixed to the column 16 along the axis 14 and, on the other hand, with gear teeth 19 meshing with pinion 20, operated by a suitable drive, not shown.

Whatever the method of assembly and feed of the wheel 13, it is essential for the described embodiment that the latter and the tools 11 have the following features:

each tool 11 should comprise an annular support or bearing part 21 (FIG. 7) between its forward machining part 22 (mill, drill, reamer, tap.....) and its rearward part 23 which is held in the tool holder 9;

the wheel 13 is to be provided with peripheral notches 24 (FIG. 2) which have outwardly facing openings, the width of which is substantially equal to the diameter of part 23 immediately behind the bearing part 21 of the individual tools (FIG. 7); thus each notch constitutes a means for receiving and storing a vertically disposed tool within a notch, the tool part 23 being supported by its bearing part 21 resting on the edge defining the notch;

the specific notch 24s (FIG. 2) selected for either extracting a tool therefrom or for storing a tool therein is determined by rotation of wheel 13 under control of a programmer, the notch selected being in the plane of movement of the transfer mechanism as hereinafter described.

Any suitable type of magazine can be used with the proviso that the selected notch 24s be brought into the operational position (FIG. 2) — i.e. the position in which it receives or makes available a tool. Accordingly, the axis of rotation of the wheel 13 of magazine 12 should be perpendicular to the axis of the spindle of the tool holder 9. Under these circumstances, the magazine may have a chain drive, slide drum or the like, for moving the stored tools along a closed or an open circuit; i.e. curvilinear or rectilinear, and one or more drive stages may be used. The disclosed embodiment using the rotating wheel 13 is preferred in view of its simple design and economy of manufacture.

The automatic tool changing device in accordance with the invention comprises, in addition to the magazine 12, a transfer mechanism 25 which, as is seen in FIGS. 1 and 3, is mounted on the head 8 of the tool holder drive spindle for movement therewith. The transfer mechanism in turn comprises a clamp 26 and a transfer effecting operating device 27.

Th clamp 26, as will be seen in FIG. 4, cooperates with a gripping flange 28, affixed by suitable means to part 23 of each tool 11, near the support or bearing part 21 of the tool (FIGS. 4 and 7). In the illustrated embodiment, the clamp 26 comprises a fixed jaw 29 (FIG. 4) supported by the operating device 27, and a movable jaw 30 longitudinally displaceable with respect to the fixed jaw. The fixed jaw is located on the operative front end portion or machining part 22 of the tool 11 and is provided with a nose extension 31, preferably flat, designed to engage the front face 32 of the flange 28 (FIG. 4). The movable jaw 30 is provided with a nose extension 33 having a V-shaped projecting portion 34, which is movable longitudinally parallel to the axis of the tool (FIGS. 4, 7 and 10). The guide portion 34 is designed to enter, during closure of the clamp, a complementary shaped, arched groove 35 provided in the rear face of the flange 28 (FIGS. 4, 7, and 8).

Providing the clamp open position during a machining operation is of importance in simplifying the design of device 27. In the open or inoperative position of the clamp, shown in FIG. 3, the clamp parts are disengaged from flange 28 and nose extensions 31 and 33 of jaws 29 and 30 are spaced from the opposite sides of the flange 28 of tool 11, when the latter is mounted in the tool holder 9. It is preferred to have the assembly formed by the clamp 26 and its operating device 27 mounted on the head 8 above the drive spindle of the tool holder 9 so as to freely expose the tool in the tool holder to the work piece.

As noted, making the clamp 26 inoperative during a machine operation, simplifies the necessary movement of the clamp 26 by the operating device 27 for moving a tool to and from holder 9 from and to the selected notch 24s of the magazine 12. All that is required is an initial forward movement of the clamp, followed by an upward pivotal movement of the clamp about an axis perpendicular to a plane containing axes 10 and 14 (see FIG. 1). The initial forward movement extracts the tool from the holder and the pivotal movement holds it in a vertical position. With the tool held by the clamp in vertical position the clamp is moved rearwardly parallel to the axis of the tool holder spindle to position the extracted tool in the appropriate programmer selected notch 24s. The movements of the operating device 27 are reversed for mounting a new tool from the magazine in the holder.

In the embodiment described, the wheel 13 is preferably located above the head 8 of the tool holder spindle, when the head is in the mid-level position shown in FIG. 1, a distance above the operating device 27 equal to the upward pivotal displacement of the support or bearing part 21 of the tool, while held by the clamp 26 during pivotal movement of the latter following its forward movement by the transfer mechanism 25, so that the support or bearing part 21 will rest on the rim of the notch, which receives the tool.

Obviously, the magazine 12 can be aligned with the tool transfer mechanism 25 by either vertically moving the head 8 of the tool holder spindle, in which case the level of the magazine would be fixed, or the magazine can be vertically displaced in which event the device producing its displacement would be controlled by a programmer to ensure that the magazine returns to the selected tool transfer or receiving level before the end of a machining operation.

The description which follows with reference to FIGS. 3–6 of the drawing, is directed to a particularly advantageous, non-limiting embodiment of the clamp 26 and its operating device 27. The structure to be described provides the pivotal and longitudinal movements of the tool above referred to. Initial longitudinal movement in a forward direction before effecting pivotal movement, facilitates extraction of the tool from the holder.

The operating device 27 comprises two slides 36 and 37 mounted in series and movable parallel to the axis 10 of the tool holder 9.

The lower slide 36 is guided along a carriage 38 of the head 8 of the tool holder drive spindle (FIGS. 4 and 6). It bears the cylinder 39 of a pressure operated actuating means, including a piston rod 41, fixed to a front angle plate 42 of the head 8 (FIGS. 3 and 4) and a piston 43 which divides the cylinder into two chambers 44 and 45 (FIG. 3).

The upper slide 37 is guided along a carriage 46 forming part of the lower slide 36 (FIG. 6), which should be over the head 8. It is attached to a pressure operated actuating device 47, bearing on the lower slide (FIG. 6).

In the embodiment shown (FIGS. 3 and 4), the lower slide 36 also carries the cylinder 48 of a pressure operated actuating means including piston rod 49 fixed to a rear plate 50 on the upper slide 37 and piston 51 which divides the cylinder 48 into two chambers 52 and 53.

The chambers 44 and 43 and the chambers 52 and 53 of the respective pressure operated actuating means can be connected selectively by a distributor (not shown) to a hydraulic circuit under pressure and to a return circuit, this distributor being operated under the control of the aforementioned programmer.

As is clearly apparent from FIGS. 4–6, the fixed jaw 29 of the clamp 26 is integral with side lugs 54 arranged between the flanges 55 of the upper slide 37. The hydraulic pressure applying means when actuated applies pressure to slide 37. The flanges 55 support axles 56 about which the lugs 54 and, consequently, the clamp 26 are able to pivot.

Moreover, as is further apparent from FIGS. 4–6, the fixed jaw 29 of the clamp is connected to two other lugs 57 arranged between the front side walls of the lower slide 36, the hydraulic pressure applying means 40 when actuated operating the slide 36. Each lug 57 carries an idler wheel 58 received in a guide groove 59 formed in the inside wall of the lower slide 36.

The articulation of the fixed jaw of clamp 26, with the structure described, will be about the aligned axles 56 of the upper slide 37 and the guiding of its wheels 58, in the grooves 59 of the lower slide 36, is intended, on the one hand, to ensure pivoting of said clamp about axles 56 when the upper slide 37 is moved longitudinally by the hydraulic pressure applying means 47 relatively to the lower slide 36 and, on the other hand, to hold the tool carried by this clamp vertically as the longitudinal movement is continued.

To this end, the aligned axles 56 are situated above the wheels 58 when the clamp is in its inoperative position (FIG. 3) and also at the end of forward longitudinal movement of the tool in the operative position of the clamp. Moreover, each groove 59 has at its front end portion an ascending curved cam profile portion 60, which effects pivoting of the clamp and, behind the cam profile, a rectilinear portion 61 parallel to the axis 10 of the tool holder 9, to ensure retention of the clamp in its vertical position in which it is disposed by said pivoting action.

As regards the clamp 26, FIG. 4 clearly shows that its movable jaw 30 includes a cylindrical member guided in a bore 62 of the fixed jaw 29, the nose 33, which passes through an elongated aperture 63 preventing lateral pivoting of the nose, being integrally formed with the cylindrical member.

The cylindrical member has integrally formed therewith a piston 64 mounted for reciprocation in a cylindrical cut-out 65 formed in the fixed jaw 29. The piston 64 defines with a rear wall defining the cylindrical cut-out, a rotary coupling 68 and piping (not shown) to the distributor above referred to. The hydraulic fluid arriving under pressure in the chamber 66 acts to close the clamp by moving the nose 33 towards the fixed jaw 31. The piston 64 is, moreover, subjected at its opposing face, to the counterforce of a spring 69 resting on a shoulder of the fixed jaw and tending to urge the clamp to its open position.

The operating piston 64 cooperates with a positively acting locking member during the closing movement of the clamp. This member is formed, in the embodiment shown, by at least one ball 70 arranged in a hole 71 in the piston 64 with freedom of movement with the piston and relative thereto in a radial direction. The ball 70 is intended to project either into a recess 72 in the fixed jaw 29 so as to lock the said piston 64 when the nose portions 31 and 33 engage the flange 28, or into a second recess 73 formed between a bore 74 of the piston 64 and a reduced wall portion of a secondary piston 75 disposed for axial reciprocation in bore 74.

The second piston 75 separates the bore 74 into two chambers 76 and 77. The chamber 76 is connected by a conduit 78 to the rotary coupling 68 and through piping (not shown) to the aforementioned distributor. The chamber 77 on the other hand, is open to the atmosphere and contains a spring 79 counteracting forward movement of the piston 75.

When the distributor connects the chamber 66 to the circuit under pressure in order to effect closure of the clamp, it simultaneously connects the chamber 76 to the return circuit. Consequently, the piston 64 moves in the direction of the arrow F while the spring 79 urges the piston 75 in the opposite direction; the inclined ramp 80 defined by the reduced wall portion of piston 75 acts on the ball 70 and forces the ball into the recess 72 as soon as the piston 64 has reached the end of its stroke; the piston 75 no longer being restrained by the ball once it enters recess 72, continues its stroke and covers the hole 71, thus preventing withdrawal of the said ball and unlocking of the clamp.

When the distributor connects the chamber 76 to the circuit under pressure and the chamber 66 to the return circuit, it causes the clamp to be opened. This results because the piston 75, when subjected to pressure, moves in the direction of the arrow F. When the piston 75 is moved sufficiently forward so that the inclined ramp 81 of piston 75 uncovers the opening 71 and is in alignment with the ball in recess 72, the ball is free to move into recess 73 at which time the piston 64 is free to move rearwardly under the influence of spring 69 and carrying with it the movable nose 33 for separation from the fixed nose 31.

The changing of a tool is effected in the following manner:

On the completion of a machining operation, the tool holder 9 is stopped and the work piece is moved away therefrom.

The clamp 26 is spaced from both sides of the flange of the tool at this stage and the operating device 27 is in the position shown in FIG. 3.

The programmer simultaneously controls, on the one hand, the rotation of the magazine 12 so as to bring the selected notch 24s into coincidence with the plane containing axes 10, 14 and on the other hand, the vertical movement of the head 8 of the tool holder drive spindle so as to bring it to a level suitable for storing the tool in the magazine.

At the same time as these movements are made, the programmer controls the loosening of the tool by either causing rotation of a screw or the opening of a clamp, such screw or clamp extending coaxially into the hollow drive spindle of the tool holder 9 for engaging the rear end of part 23 of the tool. Simultaneously, the programmer operates to control the hydraulic pressure applying means 66, 67, pistons 64, 75 which operate in conjunction with ball 72 to lock the clamp 26 over the flange of the tool.

The tool now being gripped by the clamp 26, the programmer then controls the hydraulic distributor in order to supply the operating device 27 in accordance with the sequences referred to below referring primarily to FIGS. 3 and 4:

the chamber 44 is connected to the circuit under pressure and the chamber 45 is connected to the return circuit, whilst the chambers 52 and 53 remain isolated. The upper hydraulic pressure applying means 47 thereby links the slides 36 and 37 and the lower hydraulic pressure means 40 moves the latter longitudinally in the direction of the arrow F, the clamp 26 remaining in its horizontal position. The tool 11 is thereby extracted from the tool holder 9 (FIG. 7).

When the assembly of the slides reaches the end of the forward travel, the chambers 44 and 45 of the pressure applying means 40 are isolated, and the chamber 52 is connected to the circuit under pressure and the chamber 53 to the return circuit. The upper slide 37 will now be displaced by the upper hydraulic pressure applying means 47 and will be moved longitudinally in a direction opposite to that of the arrow F, the lower slide remaining immobile. The grooves 59 being fixed and the axles 56 being moved rearward, the clamp 26 will be caused to pivot in the direction of the arrow $F_1$, by virtue of wheels 58 being constrained to movement in the curved part 59 of the grooves which are provided with a cam profile for this purpose. The clamp when so pivoted will move the tool from a horizontal to a vertical position and when the wheels approach a rectilinear part 61 of the grooves merging with the cam profile portion, the clamp 26 will be constrained for movement with the tool in vertical orientation during rearward longitudinal movement of the clamp.

As soon as the upper slide 37 has reached the end of its rearward travel, the chambers 52 and 53 are isolated whilst the chamber 45 is connected to the circuit under pressure and the chamber 44 to the return circuit. The lower slide 36 will now move longitudinally in a direction opposite that of the arrow F and will carry with it the upper slide. At the end of its rearward travel, the clamp 26 passes under the wheel 13 of the magazine and inserts the tool which it is carrying into the selected notch 24s by placing the bearing part 21 of this tool over the edge of the latter.

The programmer thus controls successively:
the opening of the clamp 26,
the rotation of the magazine 12 in order to bring it into coincidence with the plane containing the axes 10, 14, the selection of a specific tool to be mounted in the holder by programmer selecting a predetermined notch in the magazine; the clamp being open at this point will not interfere with rotation of the magazine,
the clamp after selecting a tool is closed,
the connection of the chambers 44 and 45 of the lower hydraulic pressure applying means 40 is reversed followed by connection of the chambers 52 and 53 of the upper pressure applying means, in order to cause, first of all the longitudinal advance of the clamp in the direction of the arrow F and at the end of such travel, pivoting of the clamp in a direction opposite to that of the arrow $F_1$, the grooves 59 fulfilling the same function as before but in the reverse direction.

The tool held by the clamp is thus brought into the horizontal position and located in front of the tool holder 9.

The programmer then controls the connection of the chamber 45 to the circuit under pressure and that of the chamber 44 to the return circuit-the chambers 52 and 53 being isolated — in order to cause the movement of the assembly of the slides 36 and 37 in a direction opposite to that of the arrow F. The handling part 23 of the tool enters the tool holder 9 and abuts the latter. The movement of the assembly of slides is then stopped and the chambers 44 and 45 are isolated.

The programmer then controls, on the one hand, the opening of the clamp 26, the movable nose 33 of which is separated from the flange 28 of the tool and, on the other hand, the screw or the locking clamp in the holder of the tool, a protective flange 86 of which is separated from the fixed nose 31 of the said clamp 26.

The cycle for changing the tool is then terminated and a new machining operation can be commenced.

Where the horizontal travel of the clamp between the tool holder and magazine is not too extensive and where the extraction of the tool from the holder can be achieved by a simple pivotal movement, the lower slide' 36 and its associated pressure applying means 40 can be omitted. The groove or grooves 59 will then be formed in a support integral with the head 8 of the tool holder drive spindle, this support also being usable for guiding the upper slide 37 in its movement and the attachment of its hydraulic fluid pressure applying means 47. Obviously, the forward longitudinal movement which precedes pivoting movement of the clamp would be omitted.

It has been shown hereinbefore that during a machining operation in a work piece, it is essential to maintain the clamp 26 open on both sides of the flange 28 of the tool mounted in the holder 9.

It is also essential to reduce the size of the magazine 12 for a given number of tools placed in reserve and to increase this capacity for a given size. To this end, the flange 28 as is apparent from FIG. 8, is truncated along two edges 82 which are parallel and equidistant from the plane (10,14), the width $l$ of this flange thus becoming at most equal to the diameter $d$ of the bearing part 21. Consequently, a tool may be stored in the magazine at distances $d$ around the circumference of the magazine although the outer diameter D of each flange of the tool is very much larger so that it can project from the magazine and may thus be gripped by the clamp 26.

Moreover, as the clamp 26 surrounds the flange 28 and remains in place while th tool rotates, there is a possibility of shearing occuring between the flat edges 82 of this rotating flange and the edges 83 of the jaws 31 and 33 of the fixed clamp. Also, cuttings i.e. chips, shavings, etc. produced by the tool during a machining operation reaching tthis area could jam between the clamp and the flange. This would damage the clamp and the flange.

To avoid the possibility of cuttings finding their way between the clamp and the flange, a chip shield is provided as shown in FIGS. 7–10.

The shield as protector comprises a main plate 84 on each tool of the same shape as the flange 28. It is connected to the flange in spaced relation thereto, to define a neck portion 85 enabling the free passage of the nose 31 of the clamp when the tool is rotating or is moving axially during the locking thereof.

The shield also comprises a pair of plates 86 fixed to the tool holder as shown in FIG. 7. When a tool is mounted in operative position in this holder, the plates 86 are located in the same plane as the main plate 84 and complement its shape so that the assembly of plates 84, 86 defines a circular disc covering not only the flange 28 of the tool, but also the parts of the noses 31 and 33 of the clamp which grip it.

Thus the shield assembly 84, 86 shields the cuttings from entering the space between the clamp and the flange.

In the embodiment shown, the plate 84 is centered on an annular boss 87 of the flange 28 and secured to the latter by means of screws entering the counter-sunk holes 88 and cooperating with threaded holes 89.

The flange 28 is threaded over a cylindrical part 90 of the tool, coupled to the latter by means of cotters 91 and restricted against axial movement by a split ring 92.

The shield plates 86 are integral with cylindrical sectors 93 applied to a cylindrical extension 94 of the tool holder 9 and fixed thereto by means of screws 95.

The extension 94 is provided with tongues 96 for driving the tool in rotation, these tongues cooperating with radial grooves 97 in the flange 28.

The device of the invention can be used with automatic or semi-automatic machine tools having at least one machining tool holder, especially horizontally disposed, and which are operated under programmer control.

Although the invention has been described with reference to particular embodiments it will be understood that it is not to be limited thereto and that variations and modifications may be made within the scope of appended claims.

I claim:

1. A machine comprising a substantially horizontal tool holder having a pair of protector plates fixed to the tool holder, said tool holder being operable with tools adapted to be stored in a magazine, at least one tool having a projecting flange extending in a plane transversely to the longitudinal extent of the tool and a projecting main plate of substantially the same shape as the flange, a transfer mechanism for transferring said tool to said tool holder from a magazine and vice versa, a clamp formation on the transfer mechanism, said clamp formation having jaws for gripping and holding the tool projecting flange, means forming part of the transfer mechanism for moving said jaws, with the tool operatively mounted in the tool holder, to an open position wherein said jaws are located on each side of the tool flange, said main plate being shaped and positioned adjacent relative to said tool flange to define with the latter a laterally open-ended annular recess into which one of the jaws of the clamp enters and being further positioned in the same plane as and relative to the two protector plates, when the tool is in the operating position in the holder, to form a shield against entry of tool cuttings between the tool flange and the clamp jaw.

2. A machine according to claim 1, including a magazine operatively associated with said transfer mechanism and being formed with notches for receiving from said transfer mechanism tools for positioning therein along a vertical axis, a tool holder head, a support mounted on the head, said transfer mechanism including at least one sliding member mounted for movement along the support parallel to the tool holder, means connected to said sliding member for driving the same in longitudinal direction, first means mounting the clamp formation to the transfer mechanism for pivotal movement of the clamp about an axis perpendicular to the longitudinal movement of the sliding member, and means for pivoting said clamp about said axis perpendicular to the longitudinal movement of the sliding member.

3. A machine according to claim 2, including a second sliding member, a slide-way fixed to the tool holder head for guiding the second sliding member parallel to the first, and means connected to the second member for longitudinal reciprocation thereof.

4. A machine according to claim 1, wherein said last-named means includes at least one guided member and at least one guide member, one of said members being carried by the sliding member and the other by the support, a cam profile part on the guide member cooperating with said guided member for providing said pivotal movement of the clamp during initial longitudinal movement of the sliding member to orient said tool from a horizontal to a vertical position, a rectilinear part of the sliding member merging with said cam profile part and extending parallel to the longitudinal axis of the tool holder in the direction of the magazine.

5. A machine according to claim 1, wherein one of the pair of jaws is movable and the other fixed, the fixed jaw being formed with a cylindrical opening, a first piston carried by the movable jaw and mounted to slide in the cylindrical opening in the fixed jaw, a second piston mounted to slide in a bore formed in the first piston, the second piston and the cylinder wall defining the cylindrical opening having recessed portions, at least one laterally movable locking member held captive by the first piston and selectively projecting into said recesses as a function of the relative movement of said first and second pistons, said locking member serving to lock said first piston when in said recess in said cylinder wall and when engaged by the peripheral wall of the second piston, and means for moving said second piston against the action of a spring for freeing said locking member from its locked position to permit movement of the first piston, against the action of a second spring, in opposition to the second piston, whereby to unlock the clamp.

6. A machine according tto claim 5, wherein said transfer mechanism comprises a first sliding member, the fixed jaw of the clamp being carried by the first sliding member and being provided with a projecting part engaging one face of the tool flange, and a projecting part on the movable jaw having a V-shaped extension which seats in a complementary groove formed in the opposite face of said tool flange.

7. A tool machine comprising a substantially horizontally disposed rotary tool holder adapted to carry a tool for rotation thereby about an axis, a storage magazine spaced from said tool holder for receiving and making available one of a series of tools to be stored thereby, each said tool having a projecting flange extending transversely to the longitudinal extent of the tool, a transfer mechanism disposed for operation between said tool holder and said magazine and having a clamp formation defined by a pair of jaws disposed in straddling relation to said tool projecting flange, said jaws being relatively movable between a first position thereof in which they grip the flange and a second position in which they are spaced from the flange, said transfer mechanism including means for moving said jaws to said first and second positions, said transfer mechanism further including means for moving said tool, from said tool holder, gripped by said jaws in a first orientation and then to said magazine gripped by said jaws in a second orientation perpendicular to the first, a main plate for each tool of the same shape as said flange, said main plate being fixed adjacent said projecting flange and being rebated at its outer extremities to define in the rebated region a space between said flange and said main plate, one of the jaws being received in said space, and a pair of protector plates on the tool holder which in the operative position of the tool in the tool holder compliment the shape of the main plate to define therewith an annular shield which intersects the axis of rotation for preventing entry of tool cuttings between the tool flange and the clamp jaw.

* * * * *